Nov. 28, 1950     S. KAIM     2,531,913
BRAKE FOR CAPACITOR WINDING MACHINES
Filed May 27, 1948
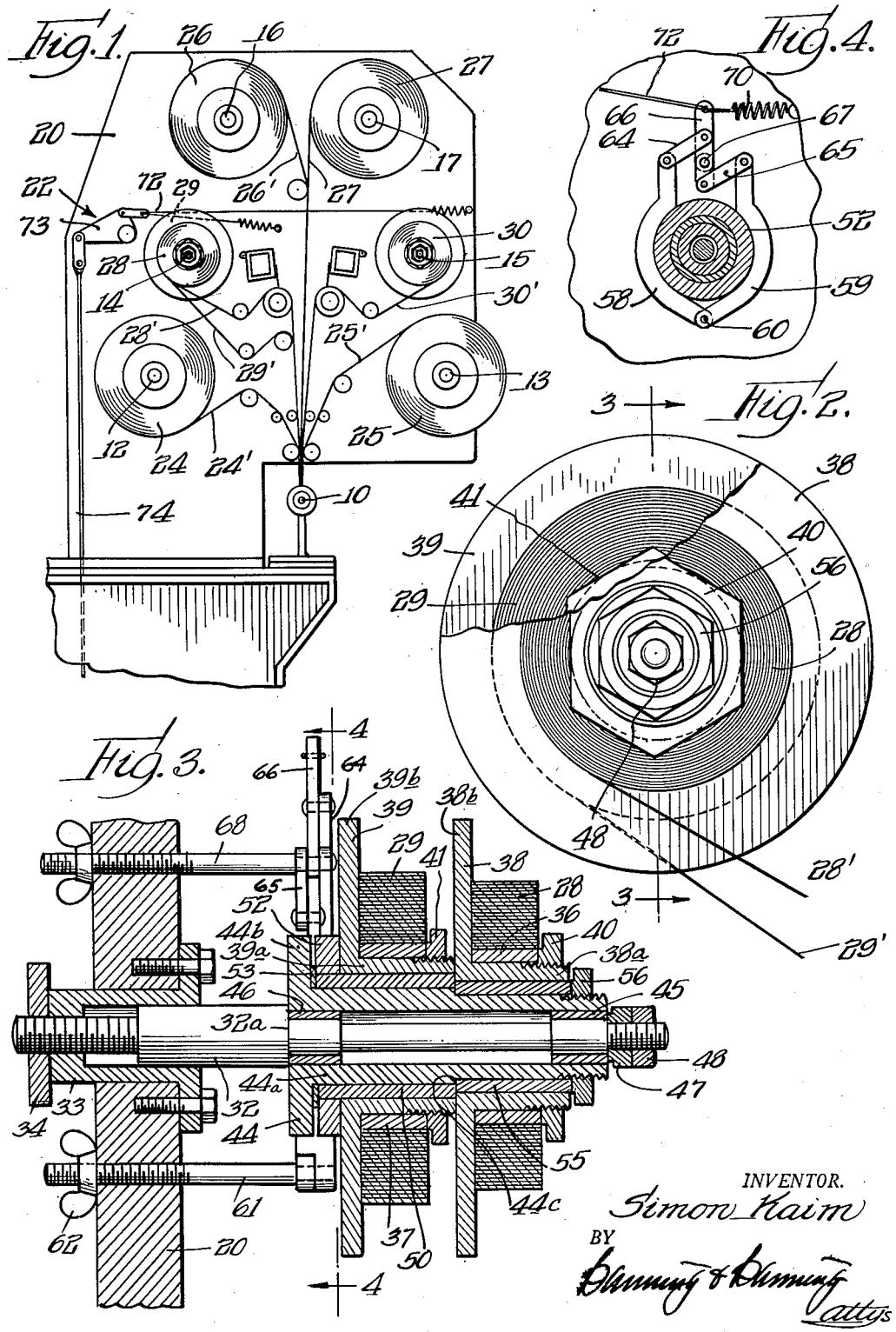
INVENTOR.
Simon Kaim Patented Nov. 28, 1950

2,531,913

UNITED STATES PATENT OFFICE 2,531,913

BRAKE FOR CAPACITOR WINDING MACHINES

Simon Kaim, Chicago, Ill., assignor to John E. Fast & Co., Chicago, Ill., a corporation of Illinois Application May 27, 1948, Serial No. 29,467

3 Claims. (Cl. 242—75)

This invention has to do with the manufacture of wound electrostatic capacitors and pertains more specifically to a combination of reels and brakes adapted for use as a component of a capacitor winding machine.

A wound electrostatic capacitor consists of a roll comprising a plurality of elongate strips of metal foil interleaved with a plurality of elongate strips of thin dielectric sheet material, usually paper; and in its most common form it includes only two strips of foil, which are insulated from each other by one or more intervening strips of dielectric. But another and less common form comprises three strips of foil, instead of two, in which case two of the foils are laid side by side, edgewise, without an intervening dielectric strip—the third foil overlapping the other two laterally and separated therefrom by one or more thicknesses of dielectric.

The metal foil, as well as the paper or other dielectric, is supplied in the form of rolls, which must be mounted on reels forming parts of the winding machine, and it is advantageous that the two companion strips of foil which are laid side by side, edgewise, be supplied from reels having a common axis. But to do so has presented something of a problem because it is necessary to apply brakes to the foil carrying reels in order to sever the foils just prior to completion of each capacitor winding operation; and it is further necessary to be able quickly to replenish the rolls of foil in order to avoid prolonged shut downs. Were it not for the indispensable brakes, there would be no problem involved in mounting two or more reels co-axially on a single spindle; but the fact is that the brakes must be provided, and the obvious expedient in that respect would result not only in a clumsy mechanism but one which inherently would entail considerable loss of time in replenishing the rolls of foil.

The primary object underlying this invention is to devise a multiple co-axial reel structure, including a brake for each reel, wherein the brake mechanism does not involve a clumsy or cumbersome mechanical arrangement and introduces no impediment to replenishment of the rolls of foil on the reels. How that end has been realized will be pointed out as an incident to the ensuing detailed description, in conjunction with the accompanying drawing, wherein—

Figure 1 is a fragmentary elevational view of a capacitor winding machine, illustrating the mounting of the reels and a portion of the brake operating mechanism;

Fig. 2 is an endwise elevation of a multiple reel structure in accordance with the invention;

Fig. 3 is a sectional view taken at line 3—3 of Fig. 2; and

Fig. 4 is a fragmentary sectional view taken at line 4—4 of Fig. 3, showing the brake levers and linkage.

Referring to Fig. 1, some of the essential elements of a capacitor winding machine here shown are a rotary mandrel 10, a plurality of reel-supporting pintles 12–17 inclusive, on which are mounted suitable reels for paper and metal foil, respectively, a vertical frame or panel 20, which serves as a mounting for the reels and other parts, and brake-operating provisions which I have identified generally by the reference numeral 22. In the particular machine here illustrated by way of example, there are reels for supporting four rolls of paper, 24–27 inclusive, and three rolls of metal foil 28–30 inclusive. Foil rolls 28 and 30 are indicated in Fig. 1. Foil roll 29 is situated to the rear of roll 28 and on the same axis of rotation, as clearly shown in Fig. 3.

Two paper strips 26' and 27' are fed downwardly in face-to-face relation from rolls 26 and 27 onto the mandrel 10; and two additional paper strips 24' and 25' are fed onto said mandrel from the rolls 24 and 25. Interleaved between the paper strips 25' and 27', there is fed downwardly from the roll 30 onto the mandrel 10 a strip of metal foil 30'; and similarly interleaved between the paper strips 24' and 26' are two strips of metal foil 28' and 29' which are fed respectively from the rolls 28 and 29. Said strips 28' and 29' are disposed side by side, edgewise, and spaced apart laterally. They are not separated by an interposed layer of paper.

Each of the paper and foil strips is suitably guided by means of guide rolls or pins secured to the panel 20; and means are provided for periodically perforating the foil strips laterally, so that when the brakes are applied to the reels which carry the rolls of foil, the strips of foil are severed just above the mandrel 10.

It is unnecessary in this instance to go into further detail concerning the winding machine as a whole, because the invention is confined to the reel and brake structure shown in Figs. 2 and 3, and that can be fully explained without delving into the intricacies of a rather complex winding machine. And, what is more, the operativeness and utility of the claimed invention is not dependent upon any feature of the machine extraneous to what is hereinafter described in adequate detail.

Referring now more especially to Figs. 2 and 3, a non-rotatable spindle 32, enlarged in one end portion to provide a shoulder 32a, is secured to the upright panel or frame 20 through the medium of a flanged sleeve 33 which is bolted to the panel and bored to provide a sliding fit for the spindle, besides being threaded axially for attachment thereto. The rear end of this spindle is provided with a lock nut 34 which bears against the adjacent end of the sleeve 33, thereby securing the spindle in any position of lengthwise adjustment to which it may be set. In order to enable setting up the machine for winding capacitors of various designs and dimensions, it is necessary to provide for shifting laterally the two reels which carry the rolls 28 and 29 of metal foil, and that may conveniently be accomplished by moving the spindle 32 axiswise.

The rolls of foil 28 and 29 are wound on tubes or so-called cones 36 and 37, usually of aluminum; and said rolls are removably mounted on reels 38 and 39, said reels comprising hub portions 38a and 39a and flange portions 38b and 39b. The hub portions are threaded externally to receive retainer nuts 40 and 41, respectively, and their outside diameters are dimensioned to fit the bores of the cones 36 and 37, but not tightly.

A flanged sleeve 44 is bored axially and provided with two bronze bushings 45 and 46 through which it is rotatably mounted on a diametrically reduced portion of the spindle 32. Said sleeve bears against the shoulder 32a on the spindle 32, and is held in place by means of two nuts 47 and 48 secured to the threaded distal end of the spindle. It will be clear that the sleeve 44 normally is free to rotate on the spindle 32. The sleeve 44 comprises an externally stepped hub portion 44a and a flange 44b at one end, which functions as a brake drum.

A bronze bushing 50 is pressed into the bore of reel 39 and is rotatable with said reel on the hub portion 44a of the sleeve 44; and fixedly secured to one end of said bushing is a steel ring 52 which functions as a brake drum and has an external diameter identical with that of the flange 44b. A bronze washer 53 is interposed between the flange 44b and the contiguous end of the bushing 50 and serves as a thrust bearing and spacer between the two brake drums.

A steel bushing 55 is pressed into the bore of the reel 38 and has a sliding fit on the hub portion 44a. It bears at one end against a shoulder 44c on the sleeve 44 and is secured in place by a retainer nut 56 which is threaded to the sleeve 44.

The reel 38 rotates with the sleeve 44, being normally secured thereto by virtue of the fact that the steel bushing 55, which forms a part of the reel, is tightly clamped against the shoulder 44c. Thus, it will be apparent that whenever the brake is applied to the flange 44b which constitutes a brake drum, the reel 38 will be stopped and held against rotation, and likewise the roll 28 of metal foil thereon. Similarly, application of the brake to the brake drum constituting the steel ring 52 will stop the reel 39 and hold the same against rotation.

The two brake drums are spanned laterally by a pair of bowed brake levers 58 and 59 (Fig. 4) which are pivotally anchored at 60 to a stud 61 (Fig. 3) which is threaded into the panel 20 and locked thereto by means of a wing nut 62. A coil spring 70 connected to a lever 66 is effective, as will be apparent, to apply the brakes through links 64 and 65 which are connected to the lever 66 at spaced points oppositely of its pivotal mounting 67 at one end of a stud 68 that is fixedly anchored to the panel 20. Normally the action of the spring 70 is opposed by a flexible cable 72, connected through a bellcrank 73 and vertical cable 74 to a mechanism, not shown, which operates periodically to release the tension on said cables and thereby allow the brakes to be applied momentarily by the spring 70.

The distinctive advantage of the above-described reel and brake construction is that the rolls of metal foil can be replenished, quickly and conveniently, without interference from the brake mechanism. Both reels 38 and 39 are immediately removable from the sleeve 44 upon withdrawal of the retainer nut 56; and the two rolls of foil can be replenished upon removal of the retainer nuts 40 and 41. In fact the time involved in replenishing the two rolls 28 and 29 is no greater, and usually less, than would be the case if the reels 38 and 39 were mounted on separate spindles.

It is obvious that various changes may be made in the specific embodiment set forth for purposes of illustration without departing from the principles of the invention. The invention is accordingly not to be limited to the precise details disclosed herein but includes all modifications thereof within the spirit and scope of the appended claims.

I claim:

1. A multiple reel and brake structure comprising: a spindle, a support for one end of said spindle, a sleeve rotatably mounted on said spindle, the end portion of said sleeve nearest said support being adapted to function as a brake drum, a first reel co-axial with and rotatably mounted on said sleeve and having a brake drum at the end thereof nearest said support, a second reel co-axial with said sleeve and normally secured thereto for rotation therewith, said second reel being positioned adjacent said first reel at the side thereof remote from said brake drums, both said reels being withdrawable from said sleeve, and means normally operative to secure said reels on said sleeve.

2. A multiple reel and brake structure comprising: a spindle, a support for one end of said spindle, a sleeve rotatably mounted on said spindle, the end of said sleeve nearest said support being flanged to form a brake drum, a first reel co-axial with and rotatably mounted on said sleeve and having a brake drum at the end thereof adjacent the flanged end of said sleeve, a second reel co-axial with said sleeve and carried thereby, said sleeve having an external shoulder for positioning said second reel axiswise, and a nut threaded to said sleeve and normally clamping said second reel against said shoulder, thereby removably securing said second reel to said sleeve so that it normally is rotatable therewith.

3. The combination with a supporting member, of a spindle attached to and projecting from said member, said spindle being reduced diametrically to form an annular shoulder at a point spaced from said member, a sleeve journaled on said spindle and bearing at one end against said shoulder, said sleeve comprising a hub portion co-axial with said spindle and an annular flange at the end thereof adjacent said shoulder, a first reel journaled on said sleeve adjacent said flange, said first reel having an annular shoulder contiguous to said flange, the peripheral surface of said flange and said reel shoulder being adapted to serve as brake drum surfaces, a second reel removably mounted on said sleeve adjacent said first reel and normally secured thereto for rotation therewith, and brake means adapted to act upon said brake drum surfaces, said combination being characterized in that said reels can be removed from said sleeve and spindle without being obstructed by said brake means.

SIMON KAIM.

REFERENCES CITED

The following references are of record in the file of this patent:

UNITED STATES PATENTS

| Number | Name | Date |
|---|---|---|
| 1,641,389 | Kroeger et al. | Sept. 6, 1927 |
| 2,405,446 | Perrault | Aug. 6, 1946 |

FOREIGN PATENTS

| Number | Country | Date |
|---|---|---|
| 595,699 | Great Britain | Dec. 12, 1947 |